(12) United States Patent
Jupudi et al.

(10) Patent No.: US 11,539,599 B2
(45) Date of Patent: Dec. 27, 2022

(54) SCALABLE MULTIPLE LAYER MACHINE LEARNING MODEL FOR CLASSIFICATION OF WI-FI ISSUES ON A DATA COMMUNICATION NETWORK

(71) Applicant: Fortinet, Inc., Sunnyvale, CA (US)

(72) Inventors: Siva Yogendra Jupudi, Bangalore (IN); Deepti Girish, Bangalore (IN); Shunmugaraj Karuvanayagam, Bengaluru (IN)

(73) Assignee: Fortinet, Inc., Sunnyvale, CA (US)

( * ) Notice: Subject to any disclaimer, the term of this patent is extended or adjusted under 35 U.S.C. 154(b) by 92 days.

(21) Appl. No.: 17/218,689

(22) Filed: Mar. 31, 2021

(65) Prior Publication Data

US 2022/0321422 A1 Oct. 6, 2022

(51) Int. Cl.
| | |
|---|---|
| *H04L 41/16* | (2022.01) |
| *G06N 20/00* | (2019.01) |
| *G06N 5/04* | (2006.01) |
| *H04L 41/069* | (2022.01) |
| *H04L 41/147* | (2022.01) |
| *H04L 41/0677* | (2022.01) |
| *H04W 84/12* | (2009.01) |

(52) U.S. Cl.
CPC ............. *H04L 41/16* (2013.01); *G06N 5/04* (2013.01); *G06N 20/00* (2019.01); *H04L 41/069* (2013.01); *H04L 41/0677* (2013.01); *H04L 41/147* (2013.01); *H04W 84/12* (2013.01)

(58) Field of Classification Search
CPC ...... G06N 5/04; G06N 20/00; H04B 10/0771; H04L 12/433; H04L 12/437; H04L 41/04; H04L 41/0677; H04L 41/069; H04L 41/12; H04L 41/147; H04L 41/16; H04L 41/26; H04L 43/50; H04L 45/00; H04L 45/02; H04L 45/04; H04J 3/14; H04W 84/12

See application file for complete search history.

(56) References Cited

U.S. PATENT DOCUMENTS

| | | | | |
|---|---|---|---|---|
| 11,354,219 | B2 * | 6/2022 | Mathen | G06F 11/366 |
| 2017/0093902 | A1 * | 3/2017 | Roundy | G06F 21/554 |
| 2021/0281592 | A1 * | 9/2021 | Givental | G06N 20/10 |
| 2021/0357757 | A1 * | 11/2021 | Nguyen | G06K 9/6218 |

OTHER PUBLICATIONS

Teixeira, Monitoring Wireless Networks Through Machine Learning Algorithms, Thesis, Técnico Lisboa, 98 pages, Nov. 2015.*
Sancho et al., New approach for threat classification and security risk estimations based on security event management, Elsevier, 18 pages, 2020.*
Asanger et al., Experiences and Challenges in Enhancing Security Information and Event Management Capability using Unsupervised Anomaly Detection, IEEE, 8 pages, 2013.*

* cited by examiner

*Primary Examiner* — Frank Duong
(74) *Attorney, Agent, or Firm* — Law Office Of Dorian Cartwright; Dorian Cartwright

(57) ABSTRACT

Multi-level machine learning models can be generated from the captured log events. Outcomes are predicted for input events in real-time. The captured log events are received and parsed to expose event outcome data. A first data set is generated by determining whether an outcome associated with the event outcome data was a success or a failure. Responsive to a failed event outcome, a second data set is generated by categorizing the failed event outcome, to train multiple level SVMs for prediction of Wi-Fi input events and automatic remediation of Wi-Fi issues.

12 Claims, 7 Drawing Sheets

Connectivity Events Classification

| Event | Reason | Root Cause | Remediation | Auto Correction |
|---|---|---|---|---|
| DHCP Failure | No response from DHCP server | Check SSID-Vlan interface configuration status if Disabled | Enable the status of vlan interface for the SSID | Enable the status of vlan interface for the SSID |
| | Vlan pool configuration mismatch | Compare the IP address assigned to any stations that are connected to the SSID and compare the IP address of the new station | Ssid likely due to new dynamic VLAN being used, but not configured on the IGT | |
| DNS Failure | Wireless station DNS process failed due to server failure | DNS server is down | Configure a different/public domain server for the region | Configure default DNS server for the region |

*FIG. 3A*

Data Events Classification

| Event | Remediation | Auto correction |
|---|---|---|
| AP Down | Increase Tx power of the neighbour AP to allow clients to connect. Raise service ticket with AP information | Increase Tx power of the neighbouring AP. Raise service ticket with AP information |
| Station moving away from AP | Increase Tx power of the neighbour AP | Increase Tx power of the neighbouring AP |
| Rogue AP Detected | Deauthenticate clients connected to Rogue AP | Deauthenticate clients connected to Rogue AP |
| Wireless Intrusion alerts | Enable protection management or change the channel | Enable protection management Change Channel |
| Vlan Failure | Raise a service ticket with switch information | Raise a service ticket with switch information |

*FIG. 3B*

SCALABLE MULTIPLE LAYER MACHINE LEARNING MODEL FOR CLASSIFICATION OF WI-FI ISSUES ON A DATA COMMUNICATION NETWORK

FIELD OF THE INVENTION

The invention relates generally to computer networking, and more specifically, to classifying string match operations from log events of a data communication system in multiple layers for machine learning to autocorrect Wi-Fi issues.

BACKGROUND

Wi-Fi is now the primary network and a mission-critical resource for most companies, as many devices today do not even have a wired option. Users need high-quality, consistent and secure wireless connectivity to do the jobs. When Wi-Fi is not working, better tools are needed to reduce issues and fix problems faster.

Conventional systems generate sequence of event logs for occurrences on a network such as a sequence of events for every wireless client connection. These events can be analyzed by network administrators to find out about the health of his network. Problematically, manual processes in this environment are inefficient and the voluminous amounts of information is hard to retain in parallel for comparison. Even conventional computer analysis is unable to efficiently scale operations concomitant with the large amounts of information produced by Internet of Things (IoT) and other network components.

Therefore, what is needed is a robust technique for classifying multi-level Wi-Fi events in a scalable manner for machine learning to address network issues.

SUMMARY

These shortcomings are addressed by the present disclosure of methods, computer program products, and systems for a classifying multi-level Wi-Fi events for machine learning.

In one embodiment, log events are captured for a private network. Mutli-level machine learning model can be generated from the captured log events. Outcomes are predicted for input events in real-time.

In another embodiment, captured log events are received and parsed to expose event outcome data. A first data set is generated by determining whether an outcome associated with the event outcome data was a success or a failure. Responsive to a failed event outcome, a second data set is generated by categorizing the failed event outcome.

In still another embodiment, multiple level SVMs are trained. A first model of SVMs is trained using the first data set and a second model of SVM can be trained using the second data set. As a result, an input prediction engine to predict an outcome of an input event in real-time based on the multiple level SVMs. Optionally, a failure prediction of the real-time input event is automatically remediated. In another embodiment, failures are derived from batch data and remediated after the fact either automatically or manually.

Advantageously, a more scalable computer system improves computer network performance and, in turn, improves computer hardware performance.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 3A and 3B are tables demonstrating autocorrections for various connectivity events and data events, according to some embodiments.

DETAILED DESCRIPTION

The description below provides methods, computer program products, and systems for classifying multi-level Wi-Fi events for machine learning.

One of ordinary skill in the art will recognize many additional variations made possible by the succinct description of techniques below. For example, Wi-Fi log evens are referred to throughout merely for the sake of clarity and conciseness, although the techniques disclosure herein can be extended to outcome events to, for instance, wired networks, security and SD-WAN.

I. Systems for Wi-Fi Event Multi-Level Classification for Machine Learning (FIGS. 1-2)

Figure 1:
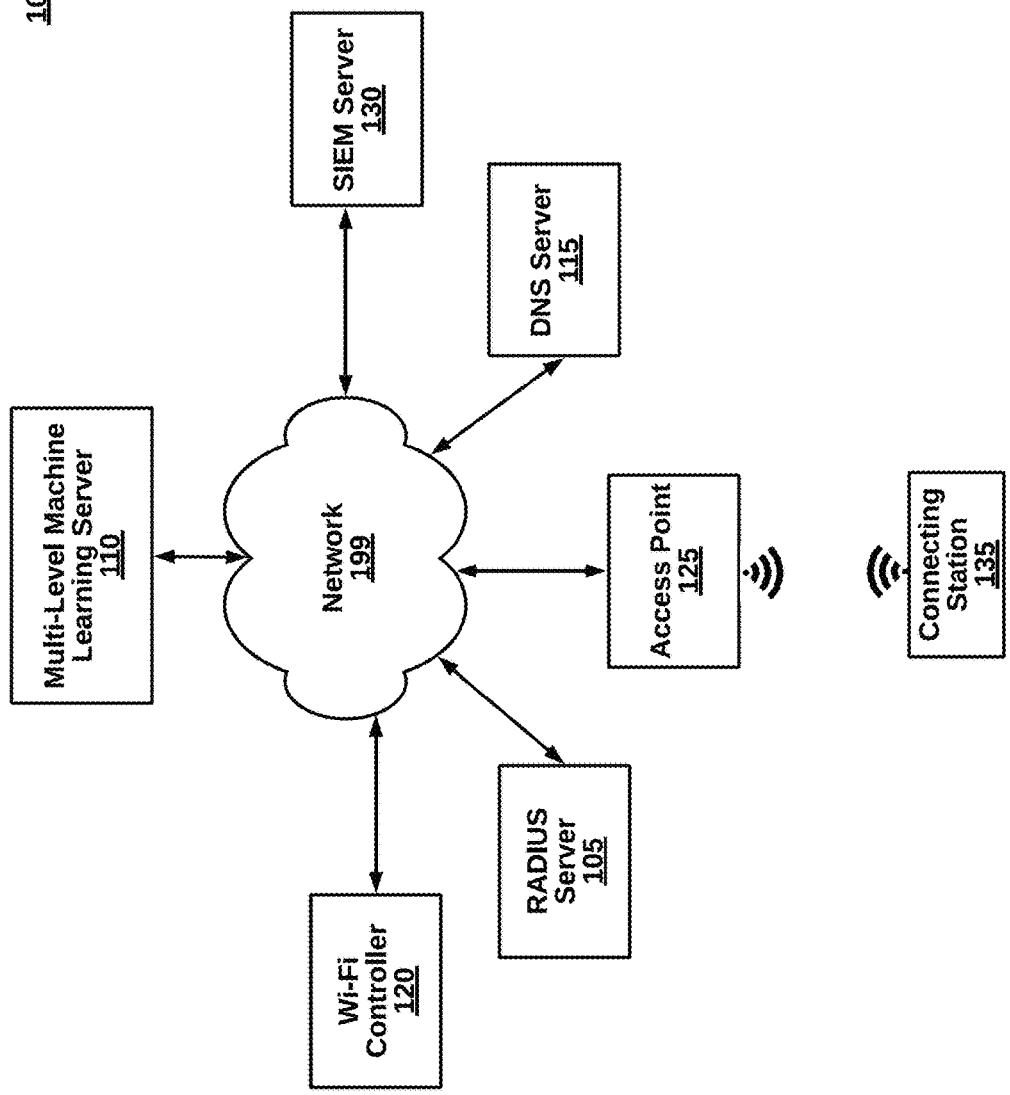
FIG. 1 is a high-level illustration of a system for Wi-Fi event multi-level classification for machine learning, according to an embodiment.
Figure 2:
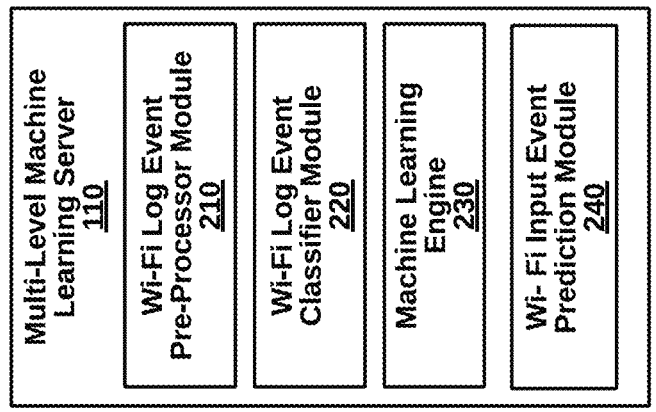
FIG. 2 is a more detailed illustration of a multi-level classification server of the system of FIG. 1, according to an embodiment.

FIG. 1 is a high-level illustration of a system 100 for Wi-Fi event multi-level classification for machine learning, according to an embodiment. The system 100 includes, in part, a multi-level machine learning server 110, a Wi-Fi controller 120 and a SIEM server 130. Many other embodiments are possible, for example, more or fewer access points, more or fewer stations, and additional components, such as firewalls, routers and switches. The components of the system 100 can be implemented in hardware, software, or a combination similar to the example of FIG. 6.

The components of the system 100 are coupled in communication over a network 199. Preferably, the multi-level machine learning sever 110, the Wi-Fi controller 120 ad the SIEM server 130 are connected to the data communication system via hard wire. Other components, such as the stations are connected indirectly via wireless connection. The network 199 can be a data communication network such as the Internet, a WAN, a LAN, WLAN, a cellular network (e.g., 3G, 4G, 5G or 6G), or a hybrid of different types of networks. The system 100 components can be located locally on a LAN or include remote cloud-based devices.

In an embodiment, the multi-level machine learning server 110 trains machine learning with several different data sets for predicting Wi-Fi input events in a more scalable manner. A machine learning technology, implemented as but not limited to SVMs, can build a model from the different data sets and adapt the model as data patterns change. One embodiment uses two data sets, while other embodiments use three or more data sets. The SVMs are trained by plotting each data item in n-dimensional space, where n represents a number of features, with the value of each feature being the value of a particular coordinate. Classification is performed by finding the hyper-plane that differentiates the two classes very well. An SVM can be a frontier that best segregates two classes. As referred to herein, Wi-Fi log events can be stored historical transactions on the network 199 with an outcome related to Wi-Fi station connections, data exchanges, and supporting transactions of other devices to support the same. Wi-Fi input events can be new transactions with a predicted outcome based on the model. One example implementation of the multi-level machine learning server 110 is set forth below in FIG. 2.

A Wi-Fi controller 120 can be at the center of a variety of different network events concerning network connectivity and data events, and thus stored those event outcomes for access by the multi-level machine learning server 110. For example, an access point 125 managed by the Wi-Fi controller 120 log connectivity events when a wireless station 135 attempt connections for access over the Wi-Fi network to a backbone network, such as the Internet. An outcome of the connection attempt can be either a success or a failure. The failure can be caused by different categories of reasons including authentication, association, DHCP and DNS. More detailed examples include denial of a wireless client, maximum station count limit reached for a PSK, no response from a RADIUS server 105, no response for DHCP process and no response for DNS process by a DNS server 115. Successful outcome category examples can include a wireless client associated with an access point, a wireless client authenticated by an access point, and a wireless client assigned an IP address. Many other categories of success and failure are possible. In one embodiment, configurations on the Wi-Fi controller 120 are automatically updated by the multi-level machine learning server 110 based on patterns discovered in event logs. In turn, downstream access points and stations can be configured by the Wi-Fi controller 120 to prevent future failed events or for a retried event.

In another embodiment, the SIEM (security information and event management) server 130 (e.g., FORTISIEM device mentioned below) can also log network events for access by the multi-level machine learning server 110. The SIEM server 130 can collect data from networks and networked devices that reflects network activity and/or operation of the network devices, and analyzing the data. For example, a reported event can be triggered when a user logs on to a device, uploads files, or moves between access points. Events logged by the SIEM server 130 and forwarded to the multi-level machine learning server 110 can be unique Wi-Fi log events, or can be duplicates of those reported by the Wi-Fi controller 120. In some embodiments, other network devices can log the same event, such as when both an access point and a RADIUS authentication server log an authentication failure as an outcome event. In still other embodiments, other network devices (e.g., a firewall, a RADIUS server, and a gateway) can report events to the multi-level machine learning server 110.

FIG. 2 is a more detailed illustration of the multi-level machine learning server 110 of the system 100 of FIG. 1. The modules can be implemented in source code stored in non-transitory memory executed by a processor. Alternatively, the modules can be implemented in hardware with microcode. The modules can be singular or representative of functionality spread over multiple components.

A Wi-Fi log event pre-processor module 210 can receive log events and parses the received log events to expose relevant event outcome data. The log events can be string match operations, one example of a string pulled from a text or CSV file. Extraction can remove MAC addresses, IP addresses, SSIDs for access points, and the like in order to isolate logdesc, action, msg, and reason, for instance. One example string is: logver=0604001691 idseq=192394270399791104 itime=1592690863 devid="FG100FTK19002333" devname="BRL-100F" vd="root" date=2020-06-21 time=00:07:41 logid="0104043640" type="event" subtype="wireless" level="warning" eventtime=1592690862321362720 tz="+0200" logdesc="Wireless client sent invalid FT auth request" sn="PS421E3X16000311" ap="BRL-S421E" vap="barbades" ssid="barbades" radioid=1 user="N/A" stamac="70:bb:e9:d1:f4:a3" channel=11 security="WPA2 Enterprise" encryption="AES" action="FT-invalid-auth-req" reason="Reserved 0" msg="Receive invalid FT authentication request frame from client 70:bb:e9:d1:f4:a3" remotewtptime="0.0"). After pre-processing, the relevant data extracted from the string can be: FT-invalid-auth-req" "Reserved 0" "Receive invalid FT authentication request.

A Wi-Fi log event classifier module 220 can generate a first data set by determining whether an outcome associated with the event outcome data was a success or a failure. Responsive to a failed event outcome, the log event classifier module 220 can also generate a second data set by categorizing the failed event outcome. Returning to the example string, the resulting category for the first data set may be Failure and the resulting category for the second data set may be Authentication.

A machine learning engine 230 can train multiple level support vector machines (SVMs). A first model of SVMs is trained using the first data set and a second model of SVM is trained using the second data set.

A Wi-Fi input event prediction engine 240, in an embodiment, predicts an outcome of an input event in real-time based on the multiple level SVMs. The input event is sent to machine learning training APIs for analysis. For example, a data input string in real-time can be: logver=0604001691 idseq=192394270399791104 itime=1592690863 devid="FG100FTK19002333" devname="BRL-100F" vd="root" date=2020-06-21 time=00:07:41 logid="0104043640" type="event" subtype="wireless" level="warning" eventtime=1592690862321362720 tz="+0200" logdesc="Wireless client sent invalid FT auth request" sn="PS421E3X16000311" ap="BRL-S421E" vap="barbades" ssid="barbades" radioid=1 user="N/A" stamac="70:bb:e9:d1:f4:a3" channel=11 security="WPA2 Enterprise" encryption="AES" action="FT-invalid-auth-req" reason="Reserved 0" msg="Receive invalid FT authentication request frame from client 70:bb:e9:d1:f4:a3" remotewtptime="0.0" As a result of the machine learning, a Failure is predicted based on the first trained model of SVMs and authentication is predicted based on the second trained model of SVMs.

An autocorrect module 250 can respond to a failure prediction of the real-time Wi-Fi input event. Example remediations of connectivity events are shown in FIG. 3A and example remediations of data events are shown in FIG. 3B. For example, the status of a VLAN interface for the SSID can be enabled due DHCP failures. In another example, a default DNS server can be configured for the region responsive to a DNS failure. In still another example, clients for a rogue access point can be deauthenticated responsive to detection of a rogue access point from a Wi-Fi log event or a Wi-Fi input event.

II. Methods for Machine Learning from Multi-Level Wi-Fi Event Classification (FIGS. 4-5)

Figure 4:
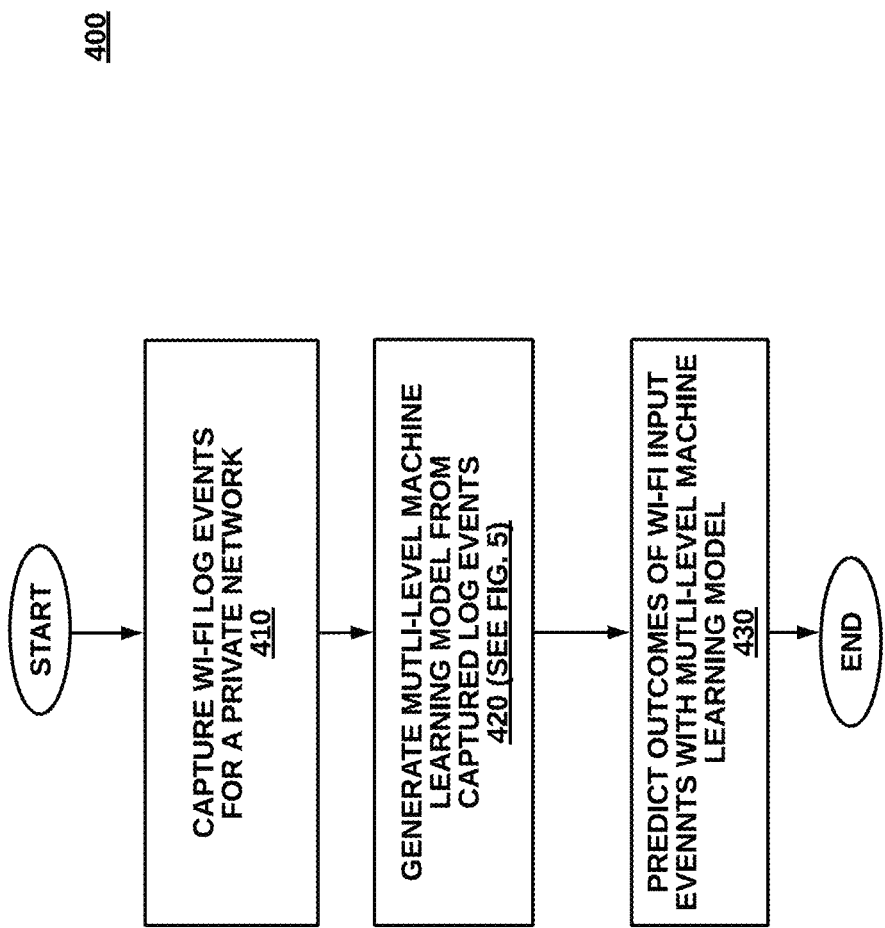
FIG. 4 is a high-level flow diagram illustrating a method for classifying multi-level Wi-Fi events for machine learning, according to one preferred embodiment.

FIG. 4 is a high-level flow diagram illustrating a method for classifying multi-level Wi-Fi events for machine learning, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, log events are captured for a private network. At step 420, multi-level machine learning model is generated from the captured Wi-Fi log events, as described more fully below in association with FIG. 5. At step 430, outcomes are predicted for Wi-Fi input events, in real-time for some cases. Optionally, a failure prediction of the real-time input event is automatically remediated (e.g., see FIGS. 3A and 3B). In another embodiment, failures are derived from batch data and remediated after the fact either automatically or manually.

Figure 5:
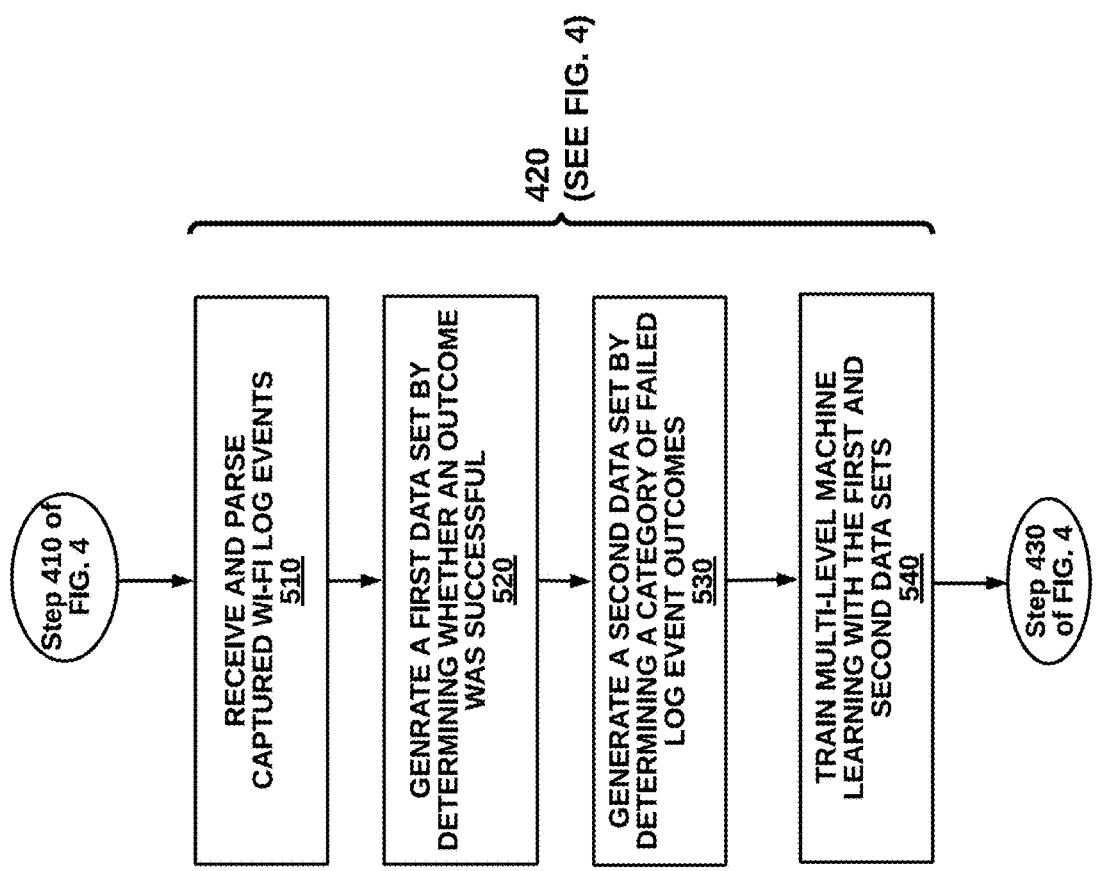
FIG. 5 is a more detailed flow diagram illustrating the step of generating multi-level models from classified events for the method of FIG. 4, according to one embodiment.

Returning to step 420, one example implementation is shown in FIG. 5. At step 510, captured log events are received and parsed to expose event outcome data. At step 520, a first data set is generated by determining whether an outcome associated with the event outcome data was a success or a failure. Responsive to a failed event outcome, a second data set is generated by categorizing the failed event outcome at step 530. Many different categories are possible.

At step 540, multiple level SVMs are trained. A first model of SVMs is trained using the first data set and a second model of SVM can be trained using the second data set.

III. Generic Computing Device (FIG. 6)

Figure 6:
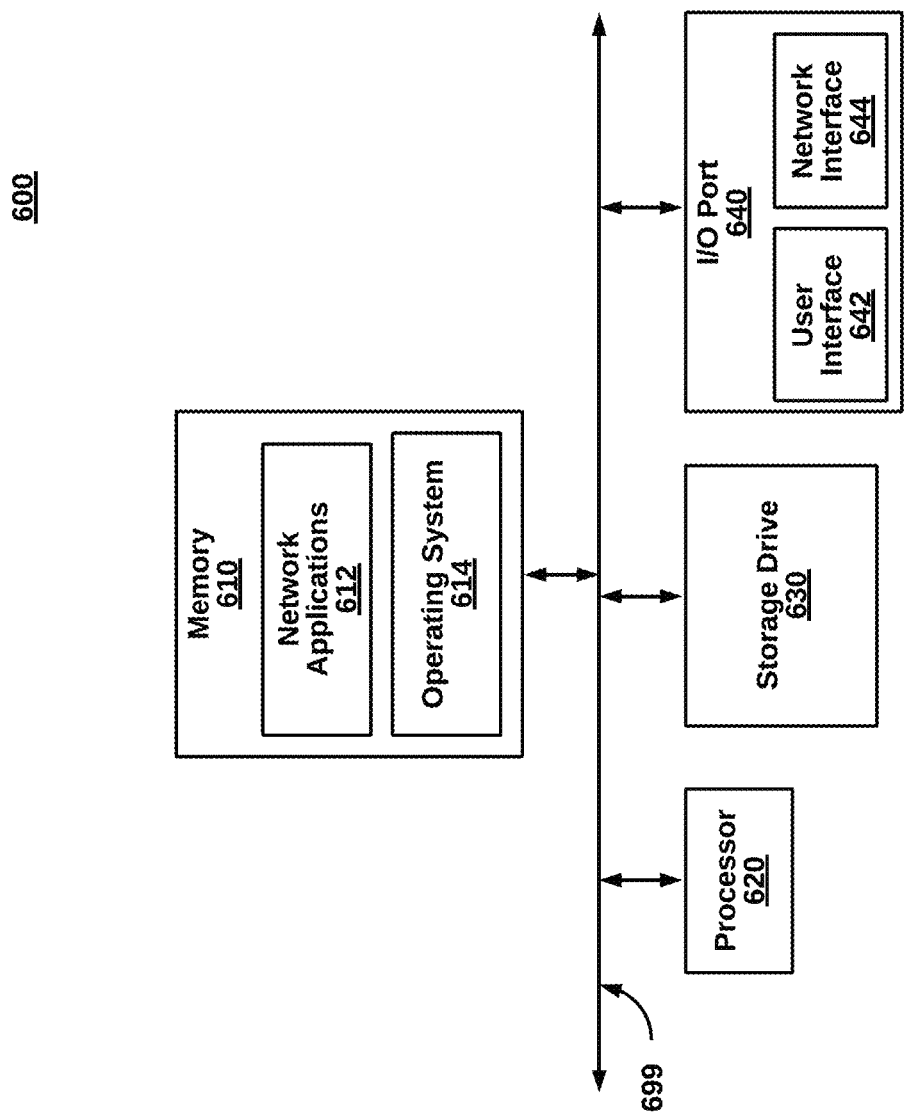
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A network device coupled to receive Wi-Fi event logs of a private data network, for classifying Wi-Fi log events of a data communication system in multiple layers using machine learning, the network device comprising:
   a processor;
   a network interface communicatively coupled to the processor and to the private data network; and
   a memory, storing:
      an event pre-processor module to receive Wi-Fi log events and parse the received Wi-Fi log events to expose event outcome data, wherein the log events are string match operations;
      an event classifier module to generate a first data set by determining whether an outcome associated with the event outcome data was a success or a failure, and responsive to a failed event outcome, to generate a second data set by categorizing the failed event outcome;
      a machine learning engine to train multiple level support vector machines (SVMs), wherein a first model of SVMs is trained using the first data set and a second model of SVM is trained using the second data set; and
      an input prediction engine to predict an outcome of a Wi-Fi input event in real-time based on the multiple level SVMs.

2. The network device of claim 1, wherein the log events comprise connectivity events and data events.

3. The network device of claim 1, wherein the connectivity events concern at least one of an association failure, an authentication failure.

4. The network device of claim 1, wherein the data events concern at least one of a rogue access point, a sticky client, an access point failure, a VLAN failure, and a wireless intrusion failure.

5. The network device of claim 1, wherein the received loge events are parsed to expose a field logdesc.

6. The network device of claim 1, wherein the autocorrect module applies a configuration on a Wi-Fi controller.

7. The networking device of claim 1, wherein the network device is remotely located from a private network containing the Wi-Fi network generating the log events.

8. The networking device of claim 1, wherein the network device is located on a private network containing the Wi-Fi network generating to the log events.

9. The networking device of claim 1, further comprising an autocorrect module to respond to a failure prediction of the real-time input event.

10. The networking device of claim 1, wherein the event pre-processor receives the Wi-Fi log events from a Wi-Fi controller that manages a plurality of access points to which Wi-Fi stations attempt connections.

11. A method in a network device coupled to receive Wi-Fi event logs of a private data network, for classifying Wi-Fi log events of a data communication system in multiple layers using machine learning, the method comprising the steps of:
   receiving Wi-Fi log events and parsing the received Wi-Fi log events to expose event outcome data, wherein the log events are string match operations;
   generating a first data set by determining whether an outcome associated with the event outcome data was a success or a failure;
   responsive to a failed event outcome, generating a second data set by categorizing the failed event outcome;
   training multiple level support vector machines (SVMs), wherein a first model of SVMs is trained using the first data set and a second model of SVM is trained using the second data set; and
   predicting an outcome of a Wi-Fi input event in real-time based on the multiple level SVMs.

12. A non-transitory computer-readable media in a network device coupled to receive Wi-Fi event logs of a private data network for, when executed by a processor, for classifying Wi-Fi log events of a data communication system in multiple layers using machine learning, the method comprising the steps of:
   receiving Wi-Fi log events and parsing the received Wi-Fi log events to expose event outcome data, wherein the log events are string match operations;

generating a first data set by determining whether an outcome associated with the event outcome data was a success or a failure;
responsive to a failed event outcome, generating a second data set by categorizing the failed event outcome;
training multiple level support vector machines (SVMs), wherein a first model of SVMs is trained using the first data set and a second model of SVM is trained using the second data set; and
predicting an outcome of a Wi-Fi input event in real-time based on the multiple level SVMs.

* * * * *